(12) United States Patent
Young

(10) Patent No.: US 7,905,202 B2
(45) Date of Patent: Mar. 15, 2011

(54) CONDENSATE TRAP FOR CONDENSING GAS BOILER

(75) Inventor: Robert J. Young, Quarryville, PA (US)

(73) Assignee: Burnham Services, Inc., Wilmington, DE (US)

( * ) Notice: Subject to any disclaimer, the term of this patent is extended or adjusted under 35 U.S.C. 154(b) by 543 days.

(21) Appl. No.: 12/047,834

(22) Filed: Mar. 13, 2008

(65) Prior Publication Data

US 2009/0229539 A1 Sep. 17, 2009

(51) Int. Cl.
*F24H 9/20* (2006.01)

(52) U.S. Cl. .................... 122/14.2; 122/18.1

(58) Field of Classification Search ............... 122/15.1, 122/18.1, 14.2
See application file for complete search history.

(56) References Cited

U.S. PATENT DOCUMENTS

| | | | |
|---|---|---|---|
| 4,480,591 A | 11/1984 | Deckers | |
| 5,321,946 A | 6/1994 | Abdelmalek | |
| 6,401,669 B1 | 6/2002 | Macgowan et al. | |
| 6,662,758 B1 * | 12/2003 | Shin | 122/18.1 |
| 6,907,846 B2 | 6/2005 | Hur et al. | |
| 7,258,080 B2 * | 8/2007 | Missoum et al. | 122/18.1 |
| 2008/0025889 A1 * | 1/2008 | Cole | 422/292 |
| 2009/0064698 A1 * | 3/2009 | Spanger | 62/280 |
| 2009/0288813 A1 * | 11/2009 | Park | 165/169 |

* cited by examiner

*Primary Examiner* — Gregory A Wilson
(74) *Attorney, Agent, or Firm* — Howson & Howson LLP

(57) ABSTRACT

A condensate trap for a condensing boiler has a generally hollow body for receiving condensate from a heat exchanger of the condensing boiler and for providing a path of flow for condensate out of the side of the boiler. The body of the condensate trap includes a condensate receiving end having an inlet, a condensate discharging end having an outlet, and an intermediate reversely-turned trap portion interconnecting the condensate receiving and discharging ends. The hollow body can be one-piece and molded of plastic. A level sensor can be mounted on or within the condensate receiving end of the body. In a preferred embodiment, the condensate receiving end includes a chamber with an opening, and the level sensor extends within the chamber and seals the opening. The condensate trap can also include an air vent located above the level sensor in communication with an air pressure sensor.

21 Claims, 3 Drawing Sheets

CONDENSATE TRAP FOR CONDENSING GAS BOILER

BACKGROUND OF THE INVENTION

The present invention relates to an energy efficient condensing gas boiler, and more particularly, the present invention relates to a novel condensate trap for use with such a boiler.

Condensing boilers are known and are disclosed, for instance, by U.S. Pat. No. 6,401,669 B1 issued to Macgowan et al., U.S. Pat. No. 6,662,758 B1 issued to Shin, U.S. Pat. No. 6,907,846 issued to Hur et al., and U.S. Pat. No. 4,480,591 issued to Deckers. Such boilers are used in residential and commercial buildings for heating water and for supplying the hot water for space heating or domestic hot water purposes.

A condensing gas boiler uses combustion heat generated by burning gas with a burner to directly heat circulating water and re-absorbs condensed latent heat in exhaust gas to improve thermal efficiency. The boiler converts the latent heat of condensation into useful energy instead of expelling it with exhaust gases. Accordingly, flue gas is discharged from a condensing boiler only after its temperature has been lowered by heat exchange to below its dew point.

Water droplets form on the walls of heat exchangers of condensing boilers in areas where the flue gas temperature cools to below, for instance, about 140° F. As an example of the amount of condensation produced within a condensing boiler, a typical condensing boiler generating about 100,000 btu of heat for one hour will produce about one to two gallons of liquid condensate.

Accordingly, the condensed water is required to be collected and discharged from the boiler. The condensation is slightly acidic, typically having a pH of about 3.5 to 4.5. Some jurisdictions require the condensation to be neutralized before disposal. Condensing gas boilers typically include condensate traps that use some of the condensate to block and prevent the escape of flue gas through the condensate discharge port of the boiler.

Although the above referenced condensing gas boilers may be satisfactory for their intended purpose, there is a need for an energy efficient condensing gas boiler having improvements with respect to condensate discharge.

SUMMARY OF THE INVENTION

According to the present invention, a condensate trap for a condensing boiler is provided. The condensate trap has a generally hollow body for receiving condensate from a heat exchanger of the condensing boiler and for providing a path of flow for condensate out of the boiler. The body includes a condensate receiving end having an inlet, a condensate discharging end having an outlet, and an intermediate reversely-turned trap portion interconnecting and extending below the condensate receiving and discharging ends. The hollow body can be made of one piece and be molded of plastic. In addition, a level sensor can be mounted on or within the condensate receiving end of the body. In one contemplated embodiment, the condensate receiving end includes a chamber with an opening, and the level sensor extends within the chamber and seals the opening. Further, the condensate trap can include an air vent in communication with an air pressure sensor. Preferably, the air vent is located above the level sensor.

According to another aspect of the present invention, a condensing gas boiler is provided. The boiler has a blower, a burner, and a heat exchanger housed within a cabinet. The heat exchanger has a sump with a condensate discharge port. Preferably, the boiler includes the above referenced condensate trap such that the inlet of the condensate receiving end is secured to the discharge port of the sump and the condensate discharging end extends laterally through a side wall of the cabinet.

BRIEF DESCRIPTION OF THE DRAWINGS

The features and advantages of the present invention should become apparent from the following description when taken in conjunction with the accompanying drawings, in which.

DETAILED DESCRIPTION OF THE INVENTION

The present invention relates to a condensing gas boiler 10 and a condensate discharge system 12. As discussed above, a gas boiler that is designed to re-absorb condensed latent heat generated when vapor in exhaust gas is permitted to form water droplets within the boiler on the walls of the heat exchanger to heighten thermal efficiency of the boiler is specifically referred to as a condensing gas boiler. Such a boiler has a higher thermal efficiency then an ordinary gas boiler that simply discharges flue gas before flue gas temperature is reduced to its dew point. Although thermal efficiency is improved in a condensing gas boiler, there are additional requirements of collecting the condensation, which can be acidic and corrosive, and safely discharging the condensation to a drain, such as a sewer drain.

Figure 1:
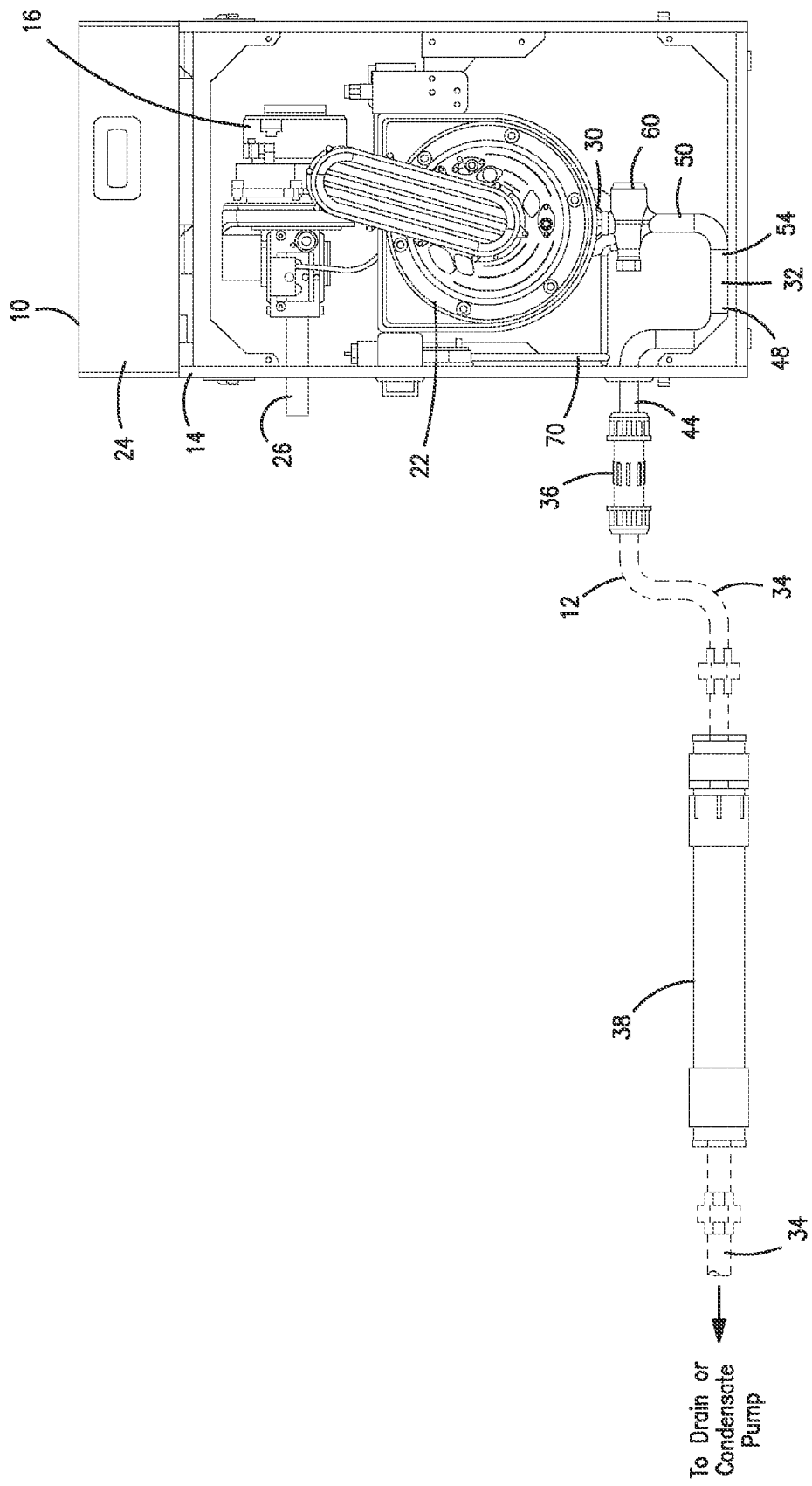
FIG. 1 is a front elevational view of a condensing gas boiler with front panel removed and condensate discharge system according to the present invention.
Figure 2:
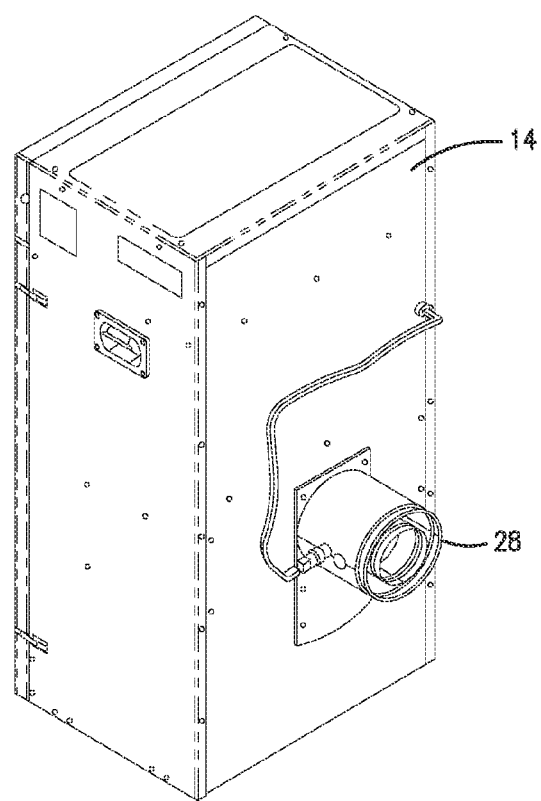
FIG. 2 is a perspective view of a rear of the boiler of FIG. 1.
Figure 3:
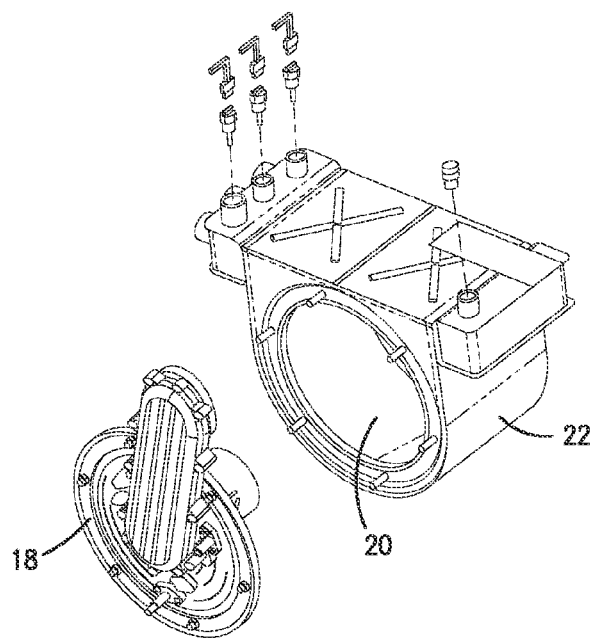
FIG. 3 is an exploded perspective view of the heat exchanger assembly and burner assembly of FIG. 1.

As best illustrated in FIGS. 1 and 2, the boiler 10 includes a generally rectangular, compact housing, or cabinet, 14 in which its components reside. The basic components include a blower 16 for delivering a gas/air mixture to a burner assembly 18 extending lengthwise within a combustion chamber 20 defined by a generally annular heat exchanger 22. The electronic controls for controlling operation of the modulating condensing gas boiler 10 are located in an upper section 24 of the cabinet 14.

The fuel gas is supplied to the boiler 10 by an external gas pipe 26 through a side of housing 14, and the exhaust or flue gas is discharged from the boiler 10 via an exhaust gas vent 28 via the rear of the housing 14. The heat exchanger 22 includes a series of coils that completely surround and absorb heat from the combustion chamber 20 in a manner that maximizes heat transfer and permits vapor carried by the exhaust gas to condense before being discharged. For example, the temperature of the flue gas may be about 200 to 220° F. within the boiler 10 and, after it completes its travel through the heat exchanger 22, may be discharged at a temperature of about 120° F. into ambient environment via exhaust vent 28. The heat exchanger 22 may be made of stainless steel or any other material that can absorb and transfer heat.

Water circulates within the coils of the heat exchanger 22 and absorbs heat. This heated water is then circulated through the building structure for purposes of space heating and/or to provide a hot water supply to kitchens, bath rooms, and the like.

The heat exchanger 22 includes a sump 30 at the bottom thereof which collects condensation flowed and funneled thereto via the force of gravity. The bottom of the sump 30 includes a condensate discharge port through which the condensation exits the heat exchanger 22 and flows into a condensate trap 32. Condensation flows through the trap 32 and is ultimately directed to a sewer drain via the force of gravity or by a condensate pump if the condensation is required to be pumped up to a drain. As shown in FIG. 1, the trap 32 extends laterally out the side of the boiler cabinet 14 and interconnects to piping 34 preferably via a compression coupling 36 or the like. Since the condensation is slightly acidic, a condensate neutralizer 38 can be installed in the piping 34 between the trap 32 and the drain or condensate pump.

As stated previously, a condensing gas boiler may be required to discharge condensate at a rate of about one gallon an hour to several gallons per hour depending upon the amount of heat being generated by the boiler or boilers. The need to discharge condensate creates several problems. The discharge port of the heat exchanger provides a path through which exhaust gas can undesirably exit the boiler. Thus, the trap must function properly to prevent exhaust gas from exiting the boiler via the condensation discharge system. In addition, a blockage of the flow of condensate at any location along the condensate discharge system, including the trap itself, can result in condensation undesirably remaining and building up within the boiler. Further, prior art traps have been known to leak, which is clearly undesirable. Still further, if the pressure of exhaust gas within the heat exchanger builds to unexpected high levels, the exhaust gas can force or blow the condensate out of the trap thereby providing undesired escape of exhaust gas from the boiler via the condensate discharge system.

The condensate trap 32 of the present invention addresses these as well as other problems. Preferably, the trap 32 is molded of plastic as one integral piece without seams, joints and the like which might otherwise provide the potential for leaks. The plastic from which the trap 32 is made should be resistant to the corrosive effects of the condensate and the temperature of the flue gas. An example of a plastic material for use in making the trap 32 is polypropylene.

The hollow trap 32 essentially has three definable portions. It includes a condensate receiving end 40 having an inlet 42, a condensate discharging end 44 having an outlet 46, and an intermediate reversely-turned trap 48 interconnecting the condensate receiving end 40 with the discharging end 44.

Figure 4:
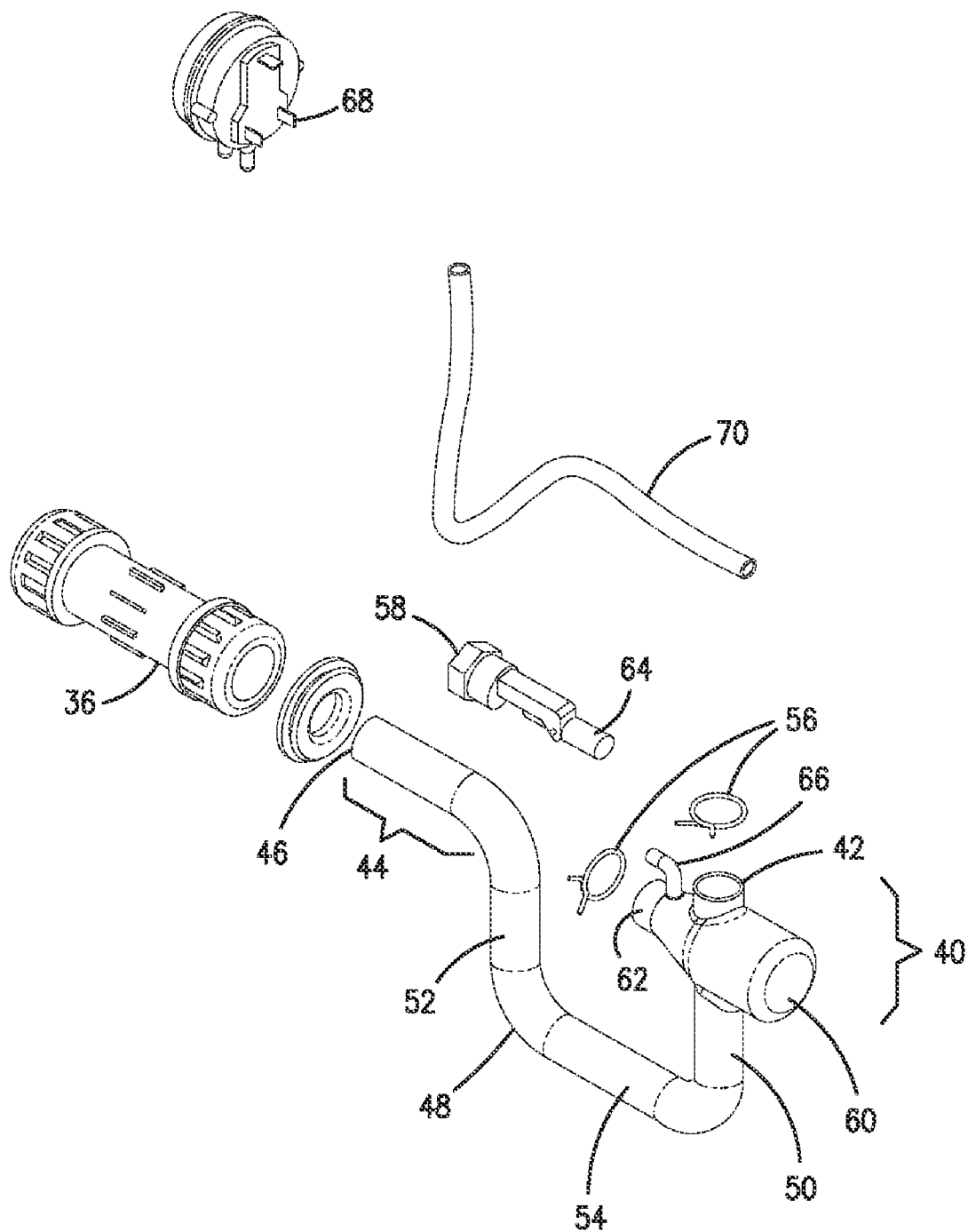
FIG. 4 is an exploded perspective view of the condensate trap of FIG. 1.

The purpose of the intermediate reversely-turned trap 48 is to retain and trap a predetermined amount of condensate within the condensate trap 32. As best shown in FIGS. 1 and 4, this is accomplished with a generally U-shaped section including spaced-apart vertical-disposed legs, 50 and 52, interconnected by a horizontally-extending cross leg 54. The legs, 50, 52 and 54, fill with condensate, or are initially filled with water during trap 32 installation. This liquid in the intermediate reversely-turned trap 48 provides a barrier to the flow of exhaust gas through the trap 32. It also prevents sewer gases or the like from passing into the boiler 10. The intermediate reversely-turned trap 48 must be of sufficient size, height, and/or volume to prevent the pressure of the exhaust gas under normal operation of the boiler 10 from forcing the trapped condensation out of the condensate trap 32. The shape of the intermediate reversely-turned trap 48 can be altered from that shown in the drawings. However, the intermediate reversely-turned trap 48 should be able to receive condensation and retain an amount of condensation via the force of gravity.

The inlet 42 of the condensate receiving end 40 of the trap 32 is secured about the condensate discharge port of the sump 30 of the heat exchanger 22 with a spring clip 56 or like fastener. Thus, condensate flows under the force of gravity from the sump 30 and through the receiving end 40 before it enters the intermediate reversely-turned trap 48.

The receiving end 40 of the trap 32 also houses a level sensing switch 58, such as a float switch. As illustrated in FIGS. 1 and 4, the switch 58 is substantially horizontally-disposed within an enlarged cavity or chamber 60 which forms an integral part of the condensate trap 32 and is located directly between the inlet 42 of the receiving end 40 and the intermediate reversely-turned trap 48. Under normal operating conditions, the cavity 60 should be substantially empty of condensate or only partly fill of condensate. This is because the condensate should drain from and exit the condensate trap 32 into piping 34 before being able to completely fill cavity 60.

The level sensing switch 58 is inserted within the cavity 60 via an opening 62 of the cavity 60 and is secured and sealed thereto with a spring clip 56 or like fastener. The switch 58 can include a pivoting distal end portion 64 that floats on the condensate. Thus, when the level of the condensate rises in the cavity 60 to a level indicative of a blockage, distal end 64 pivots and engages or disengages magnetic contacts or the like that cause a signal to be sent to the boiler controls to shut down the boiler 10 due to condensate discharge system blockage. The switch 58 can be any type of level sensing switch including those that extend within the trap 32 and those that may be mounted externally about the receiving end 40 of the trap 32. However, the location of the level sensor adjacent the inlet 42 of the condensate trap 32 ensures that it will detect a blockage anywhere along the condensate discharge system 12 including the reversely-turned trap 48.

The condensate discharging end 44 of the condensate trap 32 preferably extends laterally out of the side of the boiler cabinet 14. Thus, the discharge end 44 essentially extends at a 90° angle relative to the condensate receiving end 40 which is essentially vertically-disposed. The discharge end 44 extends from the top of the intermediate reversely-turned trap 48 and defines the level at which condensate must reach in the intermediate reversely-turned trap 48 before being discharged into piping 34. The discharge end 44 extends at an elevation below the inlet 42 of the condensate receiving end 40, and at or slightly below the elevation at which the level sensing switch 58 is mounted and extends under normal operating conditions. This enables the condensate trap 32 to be of a minimum height, which in turn permits the boiler 10 to be of a minimum height, both of which are typically deemed desirable.

A gas vent 66 is provided on the condensate receiving end 40 of the condensate trap 32. The vent 66 preferably extends from the cavity 60 at a location above the elevation of the level sensing switch 58. Thus, under normal operating conditions, this part of the condensate trap 32 communicates with flue gas flowing within the boiler 10. The vent 66 is in sealed communication with an air pressure switch 68. Depending on the location of the switch 68 relative to the condensate trap 32, a length of tubing 70 or the like may be used to connect the vent 66 to the air pressure switch 68.

The purpose of the air pressure switch 68 is to sense whether or not exhaust gas pressure is within accepted levels. In the event of exhaust gas blockage or some other problem that results in an increase in exhaust gas pressure that might be sufficient to blow the condensate trap 32 empty, the air pressure switch 68 sends a signal to the boiler controls to shut down operation of the boiler 10.

While a preferred boiler and condensate trap have been described in detail, various modifications, alterations, and changes may be made without departing from the spirit and scope of the boiler and condensate trap according to the present invention as defined in the appended claims.

The invention claimed is:

1. A condensate trap for a condensing boiler, comprising:
   a generally hollow body for receiving condensate from a heat exchanger of the condensing boiler and for providing a path of flow for condensate out of the boiler;
   said body including a condensate receiving end having an inlet, a condensate discharging end having an outlet, and an intermediate reversely-turned trap portion interconnecting and extending below said condensate receiving and discharging ends; and
   said body being of one piece and molded of plastic, and said condensate receiving end, said condensate discharging end, and said intermediate reversely-turned trap portion each forming an integral part of said molded, one piece, plastic body.

2. A condensate trap according to claim 1, further comprising a level sensor mounted on or within said condensate receiving end of said body above said intermediate reversely-turned trap portion.

3. A condensate trap according to claim 2, wherein said condensate receiving end includes a chamber with an opening, and wherein said level sensor extends within said chamber and is in fluid-tight sealing engagement with said opening.

4. A condensate trap according to claim 3, wherein said condensate discharging end extends substantially perpendicular to said condensate receiving end, and wherein said condensate discharging end defines an upper extent of said intermediate reversely-turned trap portion.

5. A condensate trap according to claim 4, wherein said condensate discharging end extends at about the same elevation as said level sensor or slightly below said elevation of said level sensor.

6. A condensate trap according to claim 5, wherein said condensate receiving end includes an air vent in communication with an air pressure sensor, and wherein said air vent is located above said level sensor.

7. A condensate trap according to claim 6, wherein said plastic one-piece body is made of polypropylene, and wherein said intermediate reversely-turned trap portion is substantially U-shaped.

8. A condensate trap for a condensing boiler, comprising:
   a generally hollow body for receiving condensate from a heat exchanger of the condensing boiler and for providing a path of flow for condensate out of the boiler, said body including a condensate receiving end having an inlet, a condensate discharging end having an outlet, and an intermediate reversely-turned trap portion interconnecting and extending below said condensate receiving and discharging ends; and
   a level sensor mounted on or within said condensate receiving end of said body.

9. A condensate trap according to claim 8, wherein said condensate receiving end includes an air vent in communication with an air pressure sensor, and wherein said air vent is located above said level sensor.

10. A condensate trap according to claim 8, wherein said level sensor is located within said condensate receiving end and is a float switch.

11. A condensate trap according to claim 10, wherein said condensate receiving end includes a chamber with an opening, and wherein said float switch extends within said chamber via said opening and is in fluid-tight sealing engagement with said opening.

12. A condensate trap for a condensing boiler, comprising:
    a generally hollow body for receiving condensate from a heat exchanger of the condensing boiler and for providing a path of flow for condensate out of the boiler;
    said body including a condensate receiving end having an inlet, a condensate discharging end having an outlet, and an intermediate reversely-turned trap portion interconnecting and extending below said condensate receiving and discharging ends; and
    said condensate receiving end including an air vent in communication with an air pressure sensor.

13. A condensing gas boiler, comprising:
    a blower, a burner, and a heat exchanger housed within a cabinet, said heat exchanger having a sump with a condensate discharge port; and
    a condensate trap having a hollow body including a condensate receiving end with an inlet secured to said discharge port of said sump, a condensate discharging end extending laterally through a side wall of said cabinet and having an outlet, and an intermediate reversely-turned trap portion interconnecting said condensate receiving and discharging ends of said condensate trap.

14. A condensing gas boiler according to claim 13, wherein said hollow body is of one piece and is molded of plastic, and wherein said condensate receiving end, said condensate discharging end, and said intermediate reversely-turned trap portion each form an integral part of said molded, one piece, plastic body.

15. A condensing gas boiler according to claim 13, further comprising a level sensor located on or within said condensate receiving end of said hollow body and at an elevation above said intermediate reversely-turned trap portion.

16. A condensing gas boiler according to claim 15, wherein said level sensor is located within said condensate receiving end and is a float switch.

17. A condensing gas boiler according to claim 15, wherein said condensate receiving end includes a chamber with an opening, and wherein said level sensor extends within said chamber and sealingly engages said opening.

18. A condensing gas boiler according to claim 17, wherein said condensate discharging end extends substantially horizontally and said condensate receiving end is disposed substantially vertically, and wherein said condensate discharging end defines an upper extent of said intermediate reversely-turned trap portion.

19. A condensing gas boiler according to claim 18, wherein said condensate discharging end extends at about the same elevation or slightly below said elevation of said level sensor.

20. A condensing gas boiler according to claim 17, wherein said condensate receiving end includes an air vent in communication with an air pressure sensor, and wherein said air vent is located above said elevation of said level sensor.

21. A condensing gas boiler according to claim 13, wherein said condensate receiving end includes an air vent in sealed communication with an air pressure sensor.

* * * * *